Aug. 7, 1962     C. R. NICOLIN     3,048,018
TURBINE POWER PLANT
Filed March 9, 1961

INVENTOR.
Curt René Nicolin
BY
Eric J. Munson
Attorney

United States Patent Office 3,048,018
Patented Aug. 7, 1962

3,048,018
TURBINE POWER PLANT
Curt René Nicolin, Finspang, Sweden, assignor to Turbin Aktiebolaget de Laval Ljungström, Finspang, Sweden, a Swedish corporation
Filed Mar. 9, 1961, Ser. No. 94,599
Claims priority, application Sweden Mar. 20, 1960
6 Claims. (Cl. 60—70)

The present invention relates to a turbine power plant which includes at least two turbine sets, each set including a radial-flow turbine having its turbine halves rotating in opposite directions, each of said halves being directly coupled to an axial-flow turbine section, each turbine half having one or two exhausts and being directly connected to an electric generator, said turbines and turbine sections being so interconnected as to cause the operating fluid to flow, first sequentially through one of the radial-flow turbines; through a heat exchanger for super-heating the operating fluid, and through the second radial-flow turbine, and then in parallel through the axial-flow turbine sections.

It is an object of the invention to provide an arrangement of this kind having numerous advantages. For example, the axial-flow turbine sections may be made identical, as can the four generators, and this will materially simplify and economize the production and manufacture of these components. As compared to prior conventional arrangements which utilize a double-rotating high-pressure radial-flow turbine and a low pressure turbine, and including a radial-flow turbine associated with axial-flow turbine sections, a more favorable weight distribution will be obtained because comparable components of the plant are substantially of equal weight. That results in a material advantage from the point of shipping and installation. With the present construction, the turbine sets will be shorter and will require less space. Also due to the fact that the turbine set to be first passed by the operating fluid also comprises axial-flow turbine sections, a favorable axial balance will be obtained and which will materially reduce the leakage.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a diagrammatic representation of the turbine power plant constructed according to the present invention;

Figure 4:
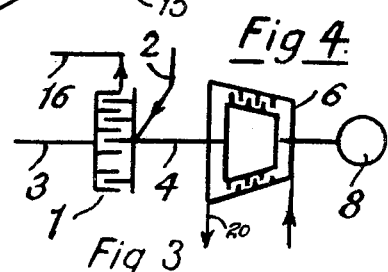
FIG. 4 is a fragmentary view of FIG. 1 diagrammatically showing a single turbine set.

The plant illustrated is a steampower plant and it consists of two turbine sets. One set includes a radial-flow turbine 1 which is to be passed by steam supplied by a conduit 2. The oppositely-rotating halves clearly shown in FIG. 4 of the radial-flow turbine 1 are connected by means of shafts 3 and 4 to individual axial-flow turbines 5 and 6 and to the individual electric generators 7 and 8. The second turbine set comprises the following components: a radial-flow turbine 9; shafts 10 and 11; axial-flow turbine sections 12 and 13 and electric generators 14 and 15.

From the radial-flow turbine 1, the steam flows through a conduit 16 into a heat exchanger 17 which is provided by an intermediate super-heater component of a steam generator. The super-heated steam is then passed through a conduit 18 into the turbine 9 which, by way of the conduits 19, supplies the steam to the axial-flow turbine sections 5, 6, 12 and 13 which are connected in parallel relatively to the flow of the steam. From these turbine sections the steam is discharged through exhausts 20 into a condenser 21 shown in FIG. 3.

Each axial-flow turbine section can be provided with two exhausts instead of the single exhaust shown at 20 in which case the steam will be injected into the mid-portion of the turbine section to divide and flow outwardly in opposite directions. The broken lines 22 associated with turbine section 6 indicates such an arrangement provided with a second exhaust 23 for connection to the condenser 21.

Figure 1:
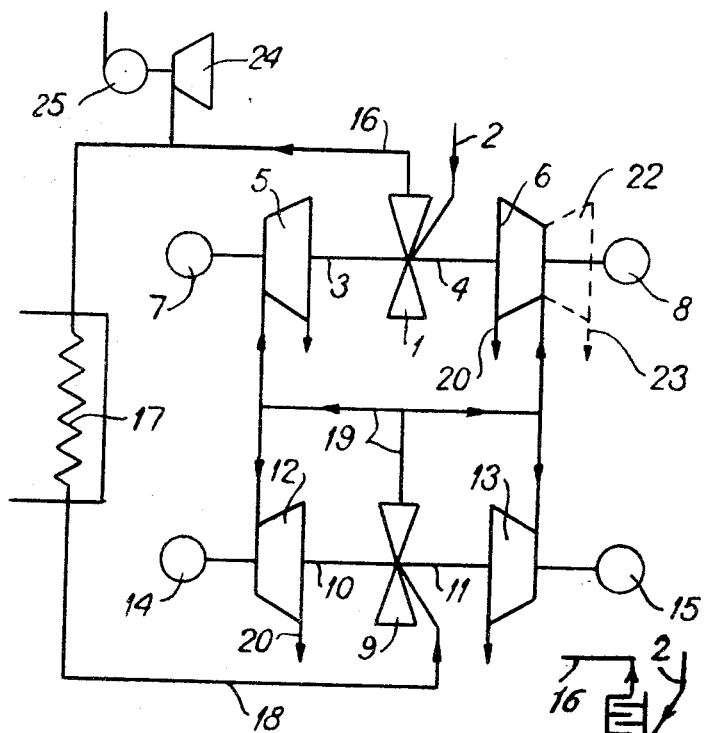

Also indicated in broken lines in FIG. 1 is a turbine 24 for use in operating a pump 25 or other device. This turbine 24 is driven by steam extracted from the conduit 16. Such tapping of the conduit and the extraction of steam therefrom is a convenient means for balancing the power output distribution, that is for causing the four generators to supply equal amounts of power.

Figure 2:
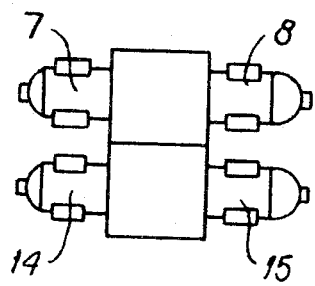
FIG. 2 is a top plan view of the same.
Figure 3:
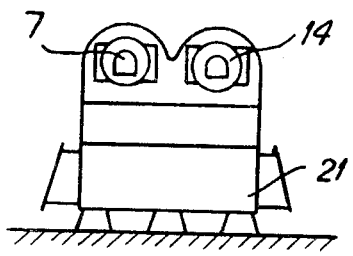
FIG. 3 is an end elevation of the same.

As is shown in FIGS. 2 and 3, the two turbine sets are preferably arranged in close side-by-side relation and are carried by the condenser 21, which is operative to exhaust steam from both of the turbine sets. The two sets of turbines may, if desired, be contained within a common housing.

While I have herein disclosed two sets of turbines, it is entirely possible to have three sets of the design disclosed in FIG. 1. In such case, two stages of intermediate super-heating of the steam will be provided for.

Having thus described a single embodiment of the invention, it is obvious that the same is not to be restricted thereto, but is broad enough to cover all structures coming within the scope of the annexed claims.

What I claim is:

1. A turbine power plant comprising, a heat exchanger, at least two turbine sets, each of said sets comprising a radial-flow turbine having turbine halves rotating in opposite directions, each of said halves being directly coupled to an axial-flow turbine section, each of said axial-flow turbine sections having at least one exhaust and directly connected to an electric generator, said turbines and turbine sections being so connected as to cause their operating fluid to flow first sequentially through one of the radial-flow turbines; through the heat exchanger to super-heat said operating fluid; through the second radial-flow turbine and then in parallel through the axial-flow turbine sections.

2. A turbine power plant as claimed in claim 1, characterized in that the generators are substantially equal in size.

3. A turbine power plant as claimed in claim 2, characterized in that the axial-flow turbine sections are substantially equal in size.

4. A turbine power plant as claimed in claim 3, characterized in that two turbine sets are arranged in close proximity relative to each other and are carried by a condenser common to both turbine sets.

5. A turbine power plant as claimed in claim 1, characterized in that the two turbine sets are enclosed in a common housing.

6. A power plant as claimed in claim 1, including a pump-driving turbine, an operating fluid conduit, means for diverting the operating fluid from the conduit to the pump-driving turbine, with said conduit being tapped for said fluid at a point between the radial-flow turbines and in advance of the heat exchanger.

References Cited in the file of this patent
FOREIGN PATENTS
134,539    Great Britain _____ July 2, 1920